US012761813B2

(12) United States Patent
Lauron et al.

(10) Patent No.: US 12,761,813 B2
(45) Date of Patent: Oct. 13, 2026

(54) INFORMATION PROCESSING APPARATUS MAKING ACCESS TO STORAGE ON NETWORK AND INFORMATION PROCESSING SYSTEM

(71) Applicant: KYOCERA Document Solutions Inc., Osaka (JP)

(72) Inventors: Louella Lauron, Osaka (JP); May Pantoja, Osaka (JP); Manuel Baricuatro, Jr., Osaka (JP); Shanice Yap, Osaka (JP); Dennis Arriola, Osaka (JP); Ma. Ava Santillan, Osaka (JP); Celine Louise Olan, Osaka (JP); Shawn Ray Aganan, Osaka (JP); Rodulfo Jumawan, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 33 days.

(21) Appl. No.: 19/033,332

(22) Filed: Jan. 21, 2025

(65) Prior Publication Data

US 2025/0244885 A1 Jul. 31, 2025

(30) Foreign Application Priority Data

Jan. 25, 2024 (JP) ................................ 2024-009797

(51) Int. Cl.
*G06F 3/06* (2006.01)

(52) U.S. Cl.
CPC .......... *G06F 3/0622* (2013.01); *G06F 3/0637* (2013.01); *G06F 3/067* (2013.01)

(58) Field of Classification Search
CPC ...... G06F 3/0622; G06F 3/0637; G06F 3/067; G06F 3/1222; G06F 3/1238; G06F 21/608; H04N 1/00244; H04N 1/4413; H04N 1/4426
See application file for complete search history.

(56) References Cited

U.S. PATENT DOCUMENTS

| | | | |
|---|---|---|---|
| 8,310,703 | B2 | 11/2012 | Nuggehalli et al. |
| 8,823,986 | B2 | 9/2014 | Nuggehalli et al. |
| 10,394,505 | B2 | 8/2019 | Tabuki |
| 10,785,200 | B2 | 9/2020 | Takahashi |

(Continued)

*Primary Examiner* — Larry T Mackall
(74) *Attorney, Agent, or Firm* — IP Business Solutions, LLC.

(57) ABSTRACT

An information processing apparatus includes a communication device, an access-right information storage device, and a controller. The communication device performs data communication with an external device, via a network. The access-right information storage device contains access-right information with respect to a storage on the network, in association with user identification information for identifying a user. The controller makes access to the storage according to a processing request from the user, in a case where the access-right information, associated with the user identification information of the user requesting the processing, is stored in the access-right information storage device, when the communication device receives, from an external image processing apparatus, the processing request to the storage from the user, and causes the storage and the image processing apparatus to upload and download data between each other, via the communication device.

8 Claims, 5 Drawing Sheets

(56) References Cited

U.S. PATENT DOCUMENTS

| | | | | |
|---|---|---|---|---|
| 2002/0080410 | A1* | 6/2002 | Yang | H04N 1/00241 358/400 |
| 2006/0053437 | A1* | 3/2006 | Bruner | G06Q 20/045 725/23 |
| 2010/0195135 | A1* | 8/2010 | Ohba | G06K 15/1817 358/1.14 |
| 2015/0350344 | A1 | 12/2015 | Sugimura | |
| 2018/0176417 | A1 | 6/2018 | Ando | |

* cited by examiner

INFORMATION PROCESSING APPARATUS MAKING ACCESS TO STORAGE ON NETWORK AND INFORMATION PROCESSING SYSTEM

INCORPORATION BY REFERENCE

This application claims priority to Japanese Patent Application No. 2024-009797 filed on Jan. 25, 2024, the entire contents of which are incorporated by reference herein.

BACKGROUND

The present disclosure relates to an information processing apparatus and an information processing system, and in particular to a technique to make access to a storage on a network.

Some of image processing apparatuses, such as multifunction peripherals, are configured to read out and print image data stored in a storage on a network (e.g., cloud storage), and store scanned image data in the storage. Examples of the cloud storage include Google Drive, OneDrive (registered trademark), and Evernote (registered trademark). In addition, techniques related to printing of the image data stored in the storage on the network have been proposed.

SUMMARY

The disclosure proposes further improvement of the foregoing technique.

In an aspect, the disclosure provides an information processing apparatus including a communication device, an access-right information storage device, and a control device. The communication device performs data communication with an external device, via a network. The access-right information storage device contains access-right information with respect to a storage on the network, in association with user identification information for identifying a user. The control device includes a processor, and acts as a controller when the processor executes a control program. The controller makes access to the storage according to a processing request from the user, in a case where the access-right information, associated with the user identification information of the user requesting the processing, is stored in the access-right information storage device, when the communication device receives, from an external image processing apparatus, the processing request to the storage from the user, and causes the storage and the image processing apparatus to upload and download data between each other, via the communication device.

In another aspect, the disclosure provides an information processing system including an image processing apparatus and an information processing apparatus. The information processing apparatus includes a communication device, an access-right information storage device, and a control device. The communication device performs data communication with an external device, via a network. The access-right information storage device contains access-right information with respect to a storage on the network, in association with user identification information for identifying a user. The control device includes a processor, and acts as a controller when the processor executes a control program. The controller makes access to the storage according to a processing request from the user, in a case where the access-right information, associated with the user identification information of the user requesting the processing, is stored in the access-right information storage device, when the communication device receives, from an external image processing apparatus, the processing request to the storage from the user, and causes the storage and the image processing apparatus to upload and download data between each other, via the communication device. The image processing apparatus includes a reception device, and a data transmission/reception device. The reception device receives log-in information necessary for logging in to the information processing apparatus, from the user, and the data transmission/reception device transmits the log-in information received by the reception device, to the information processing apparatus. The controller of the information processing apparatus causes the storage and the image processing apparatus to upload and download data between each other, upon permitting log-in to the information processing apparatus on a basis of the log-in information, after receiving the log-in information from the image processing apparatus, via the communication device.

DETAILED DESCRIPTION

Figure 1:
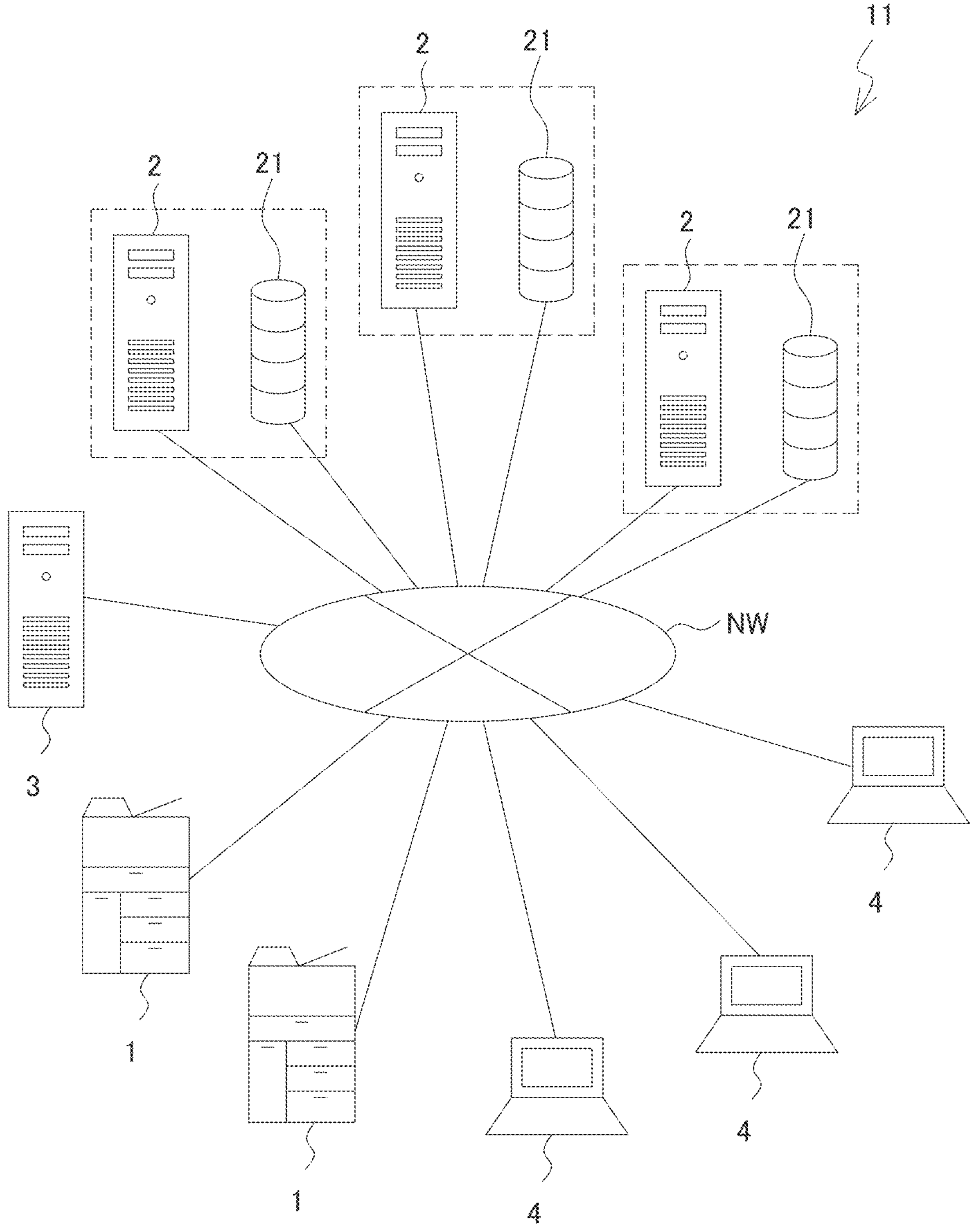
FIG. 1 is a schematic diagram showing an overall configuration of an information processing system, including an information processing apparatus according to an embodiment of the disclosure.

Hereafter, an information processing apparatus and an information processing system, according to an embodiment of the disclosure, will be described with reference to the drawings. FIG. 1 is a schematic diagram showing an overall configuration of the information processing system, including the information processing apparatus according to the embodiment of the disclosure.

The information processing system 11 includes image forming apparatuses 1 and an information processing apparatus 3. The image forming apparatuses 1 and the information processing apparatus 3 are connected to one another, via a network NW. Further, managing devices 2, storages 21, and terminal devices 4 are also connected to one another via the network NW, in addition to the image forming apparatuses 1 and the information processing apparatus 3. The managing device 2 manages data stored in the storage 21 on the network NW, and executes operations for uploading and downloading data to and from the storage 21.

The image forming apparatus 1 is configured as a multifunction peripheral having a plurality of functions, such as copying, printing, scanning, and facsimile transmission. The image forming apparatus 1 exemplifies the image processing apparatus according to the disclosure.

The managing device 2 is for example a storage server, and provides storage service. Examples of the storage service include Google Drive, One Drive, and Evernote.

The information processing apparatus 3 acts, for example, as an intermediate server, to cause the storage 21 on the network NW and the image forming apparatus 1 to upload and download data, between each other.

The terminal device 4 is, for example, a personal computer, and performs data communication with an external device, via the network NW. The terminal device 4 also transmits user authentication information, necessary for logging in to the storage service, to the information processing apparatus 3 via the network NW. The information processing apparatus 3 transmits the user authentication information received, to the managing device 2 which manages the storage service, when the user logs in to the storage 21, and acquires access-right information with respect to the storage 21, from the managing device 2 which manages the storage service.

Figure 2:
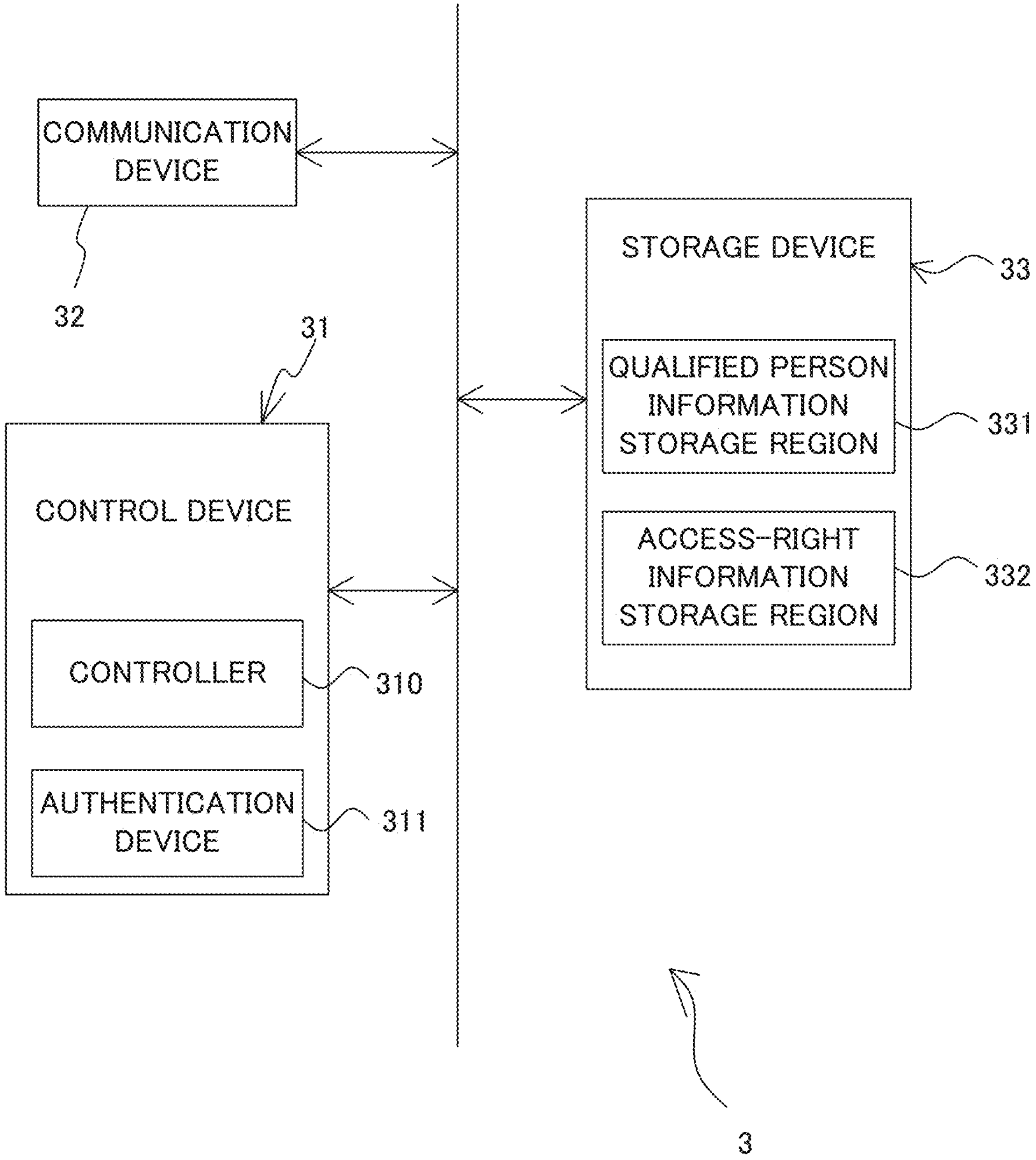
FIG. 2 is a functional block diagram schematically showing an essential internal configuration of the information processing apparatus.

FIG. 2 is a functional block diagram schematically showing an essential internal configuration of the information processing apparatus 3. The information processing apparatus 3 acting as the intermediate server includes a control device 31, a communication device 32, and a storage device 33.

The communication device 32 is a communication interface for performing data communication with an external device, via the network NW. For example, the communication device 32 performs the data communication, with the image forming apparatus 1, the managing device 2, the storage 21, and the terminal device 4, which are shown in FIG. 1.

The storage device 33 is a large-capacity memory unit such as a hard disk drive (HDD) or a solid state drive (SSD), and contains various control programs, and connection programs for making access to the managing device 2 and the storage 21 (e.g., programs for logging in to Google Drive, OneDrive, or Evernote to enable transmission and reception of data, applications provided from the mentioned storage services, and browser having the URL of those storage services). The storage device 33 includes a qualified person information storage region 331 and an access-right information storage region 332.

The qualified person information storage region 331 contains the authentication information of the user to be permitted to log in to the information processing apparatus 3. The authentication information stored in the qualified person information storage region 331 includes user identification information (user ID) for identifying the user to be permitted to log in, and a password. Here, the authentication information for the information processing apparatus 3 is not the log-in information (authentication information) used for logging in to the managing device 2.

In the access-right information storage region 332, the access-right information with respect to the storage 21 is stored, in association with the user identification information, with respect to each piece of the user identification information. The access right refers to the right that enables the access to the storage 21, and retrieval or acquisition of data from the storage 21. When the information processing apparatus 3 transmits the log-in information, necessary for logging in to the storage service provided by the storage 21, to the managing device 2, the managing device 2 permits the information processing apparatus 3 to make access to the storage 21. In this case, the managing device 2 transmits a permission signal, permitting the access to the storage service 21, to the information processing apparatus 3 at predetermined intervals. The controller 310 of the information processing apparatus 3 stores, on the ground that the access right to the storage 21 is granted while the permission signal is received at predetermined intervals, the access-right information indicating that the access right to the storage 21 is granted in the access-right information storage region 332 in association with the user identification information of the user who has logged in to the storage 21. The storage process of the access-right information in the access-right information storage region 332 will be subsequently described in detail.

The control device 31 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 acts as the controller 310 and an authentication device 311.

The control device 31 acts as the controller 310, when the processor operates according to the control program stored in the storage device 33. Here, the controller 310 may be constituted in the form of a hardware circuit, instead of being realized by the operation of the control device 10 according to the control program. This also applies to other embodiments, unless otherwise specifically noted.

The controller 310 serves to control the overall operation of the information processing apparatus 3. The controller 310 is connected to the communication device 32 and the storage device 33, to control the operation of the mentioned components, and transmit and receive signals and data to and from those components.

In addition, upon receipt of a processing request from the user, transmitted from the image forming apparatus 1, the controller 310 causes the storage 21 and the image forming apparatus 1 to upload and download data between each other, according to the processing request from the user, in the case where the access-right information is stored in the access-right information storage region 332, in association with the user identification information of the user requesting the processing.

Figure 3:
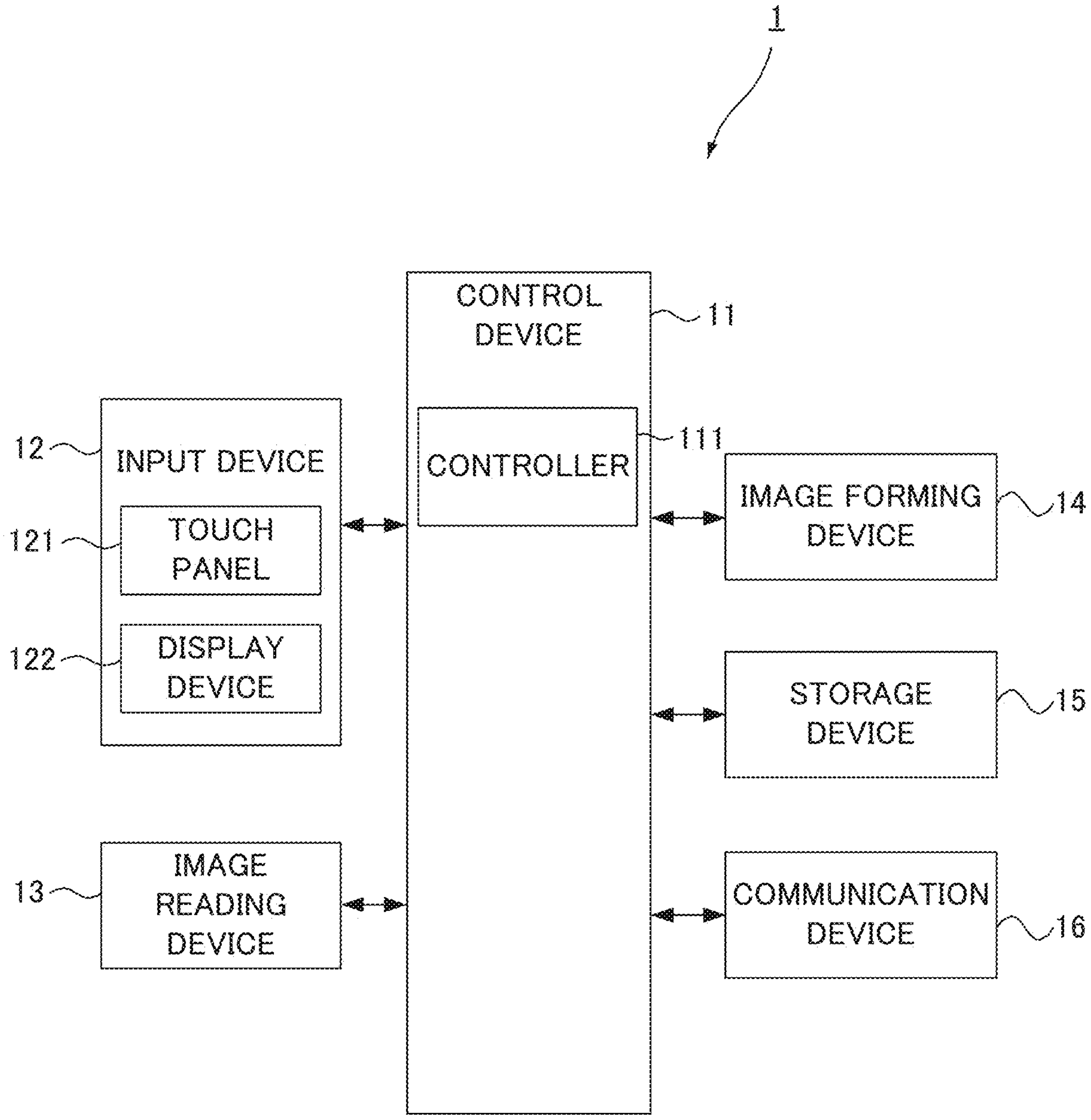
FIG. 3 is a block diagram showing an electrical configuration of an image forming apparatus according to the embodiment of the disclosure.

FIG. 3 is a block diagram showing an electrical configuration of an image forming apparatus according to the embodiment of the disclosure. Although the image forming apparatus is exemplified by a multifunction peripheral in this embodiment, it suffices that the image forming apparatus possesses at least a printing function, such as a printer or a copier.

The image forming apparatus 1 includes a control device 11, an input device 12, an image reading device 13, an image forming device 14, a storage device 15, and a communication device 16. The input device 12 includes a touch panel 121 for receiving a touch operation of the user, and a display device 122. The display device 122, which displays operation screens and messages, may be integrally constituted with the touch panel. The input device 12 also includes hard keys such as an enter key for confirming various operations and settings, and a start key.

The image reading device 13 includes, for example, a scanner, to read an image of a source document and acquire the image data. The image forming device 14 includes a photoconductor drum, a charging device that electrically charges the surface of the photoconductor drum uniformly, an exposure device that emits light to the surface of the photoconductor drum, thereby forming an electrostatic latent image, a developing device that develops the electrostatic latent image on the surface of the photoconductor drum into a toner image, and a transfer device that transfers the toner image (picture image) on the surface of the photoconductor drum to a recording sheet. With these components, the image forming device 14 prints the image represented by the image data, on the recording sheet. The image forming device 14 prints the image data acquired by the image reading device 13, or the image data stored in the storage device 15.

The storage device 15 is a large-capacity memory unit such as a hard disk drive (HDD) or a solid state drive (SSD), and contains various control programs and data tables. The communication device 16 includes, for example, a communication module, and transmits and receives various types of data to and from an external device via a network.

The control device 11 includes a processor, a random-access memory (RAM) and a read-only memory (ROM). The processor is, for example, a central processing unit (CPU), a micro processing unit (MPU), or an application specific integrated circuit (ASIC). The control device 11 acts as the controller 111, when the processor operates according to the control program, for example stored in the ROM. Here, the controller 111 may be constituted in the form of a hardware circuit, instead of being realized by the operation according to the control program.

The controller 111 serves to control the overall operation of the image forming apparatus 1. The controller 111 executes operations necessary for transmission and reception of data to and from the information processing apparatus 3, according to the instruction from the user inputted through the input device 12.

Figure 4:
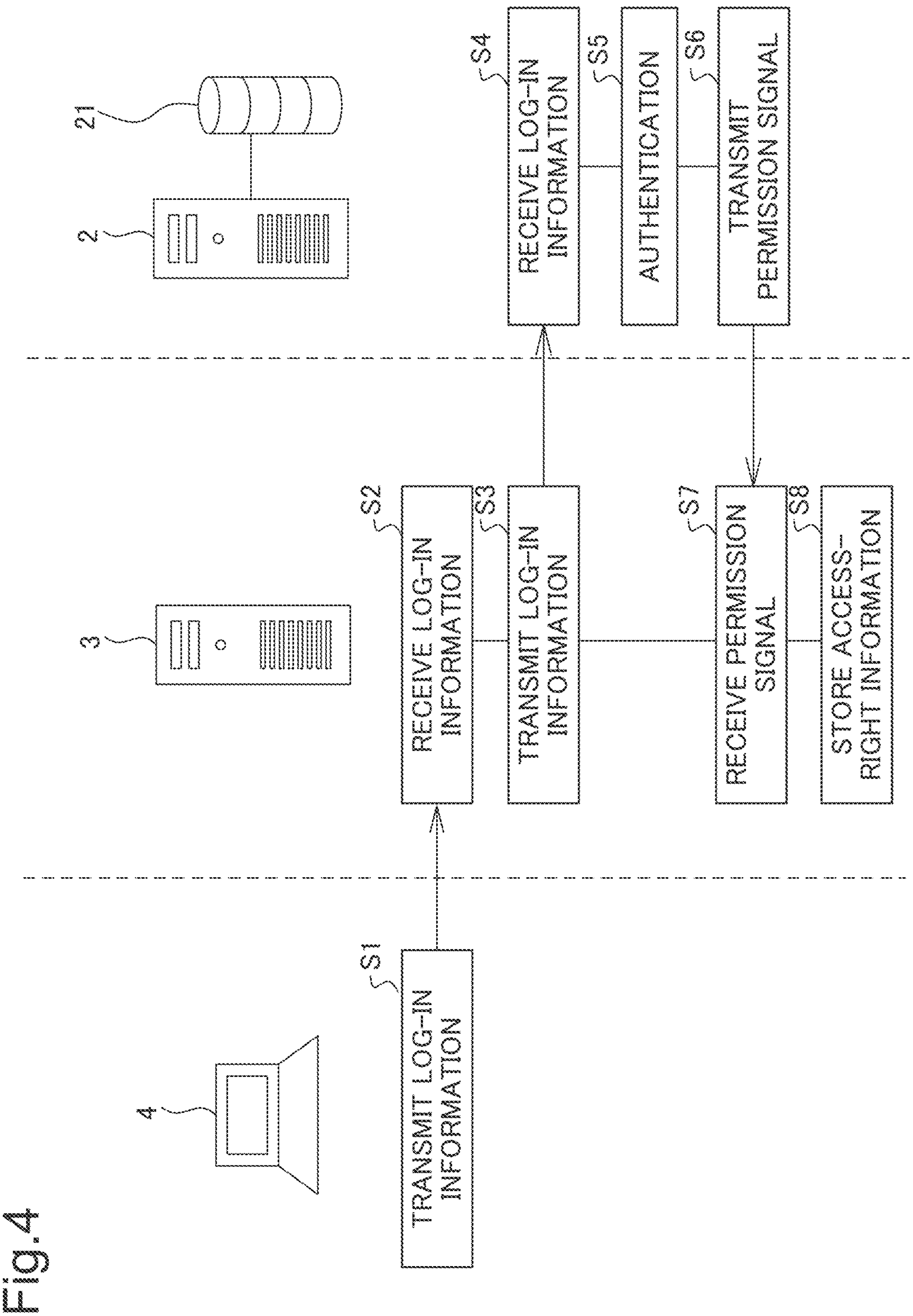
FIG. 4 is a flowchart showing an example of a process through which a user having an account for storage acquires access-right information to the storage, via a terminal device.

Hereunder, a process through which the user having the account in the storage 21 (registered user), acquires the access-right information with respect to the storage 21 via the terminal device 4, will be described. FIG. 4 is a flowchart showing an example of the mentioned process.

The terminal device 4 transmits, according to the instruction from the user, the log-in information necessary for logging in to the storage 21, to the information processing apparatus 3 (S1). On the side of the information processing apparatus 3, upon receipt of the log-in information from the terminal device 4 via the communication device 32 (S2), the controller 310 transmits the log-in information (authentication information) to the managing device 2 (S3).

Upon receipt of the log-in information from the information processing apparatus 3 (S4), the managing device 2 authenticates the log-in information (S5), permits the log-in information admitted as legitimate to make access to the storage 21, and transmits the permission signal permitting the access to the storage 21, to the information processing apparatus 3 (S6).

Upon receipt of the permission signal from the managing device 2 via the communication device 32 (S7), the controller 310 of the information processing apparatus 3 stores the access-right information with respect to the storage 21, in the access-right information storage region 332 (S8). While the access-right information is kept stored in the access-right information storage region 332, the information processing apparatus 3 keeps the log-in state to the storage 21.

Figure 5A:
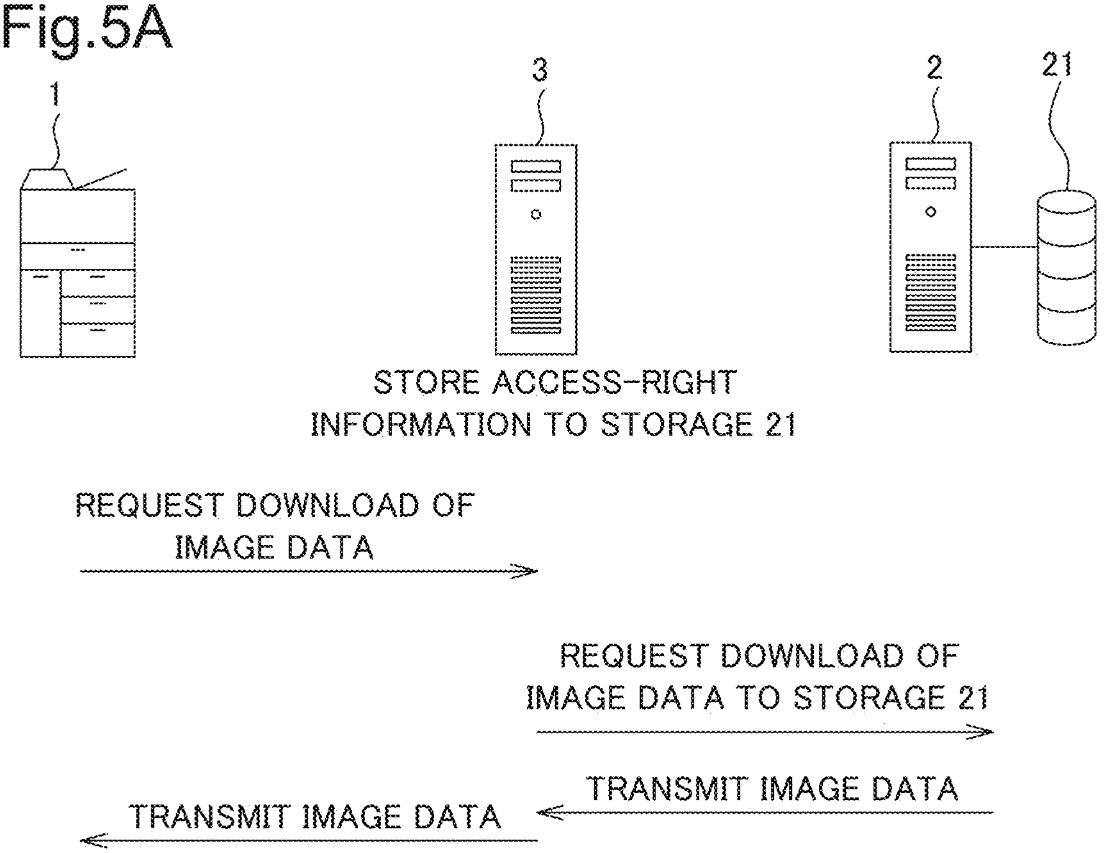
FIG. 5A and FIG. 5B are schematic diagrams each showing an operation performed by the image forming apparatus, to upload and download to and from the storage, via the information processing apparatus.
Figure 5B:
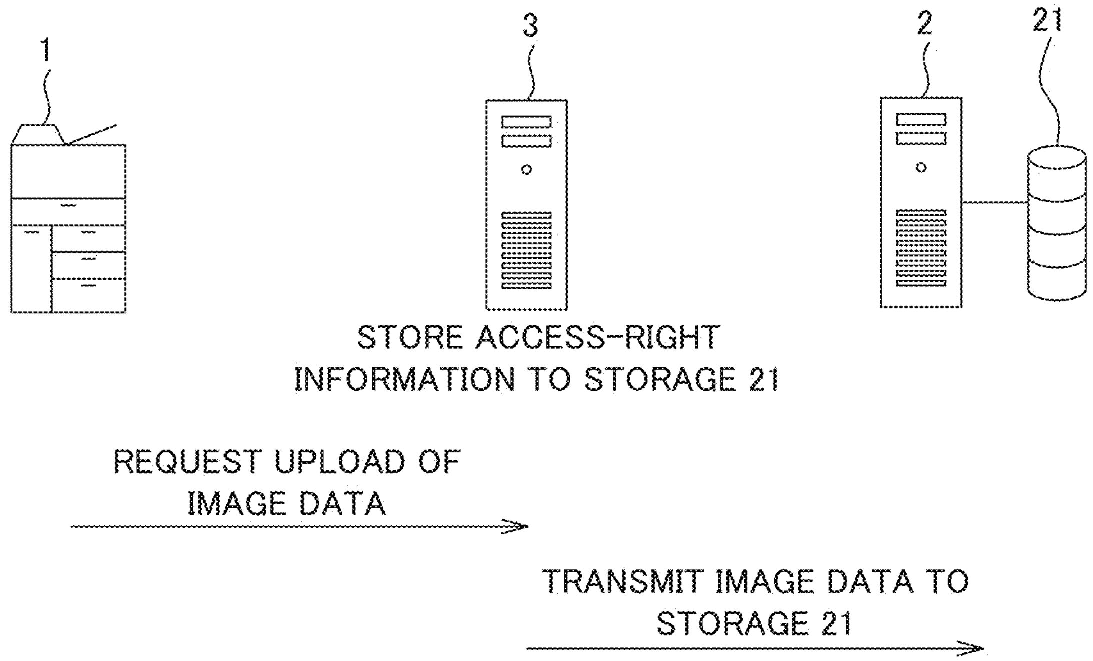

Hereunder, a process through which the information processing apparatus 3 causes the storage 21 and the image forming apparatus 1 to upload and download the data between each other will be escribed. FIG. 5A and FIG. 5B are schematic diagrams explaining the process through which the image forming apparatus 1 uploads and downloads the data to and from the storage 21, via the information processing apparatus 3.

Referring to FIG. 5A, the image forming apparatus 1 requests the information processing apparatus 3 to allow downloading of the image data stored in the storage 21 (exemplifying the data, the same applies hereinafter), as object to be printed. Here, it will be assumed that the image forming apparatus 1 has already transmitted the user identification information necessary for logging in, to the information processing apparatus 3, and the information processing apparatus 3 has already permitted the user to log in thereto.

Upon receipt of the request, the information processing apparatus 3 (controller 310) decides whether the access-right information, associated with the user identification information of the user of the image forming apparatus 1, is stored in the access-right information storage region 332. When the access-right information associated with the user identification information of the user is stored in the access-right information storage region 332, the controller 310 requests the storage 21 to allow downloading of the image data, designated as the object to be printed. The controller 310 thus acquires the image data from the storage 21 (storage 21 transmits the image data), and transmits the acquired image data to the image forming apparatus 1. Accordingly, the image forming apparatus 1 can retrieve the image data from the storage 21, and print the image represented by the image data.

Referring to FIG. 5B, the image forming apparatus 1 requests the information processing apparatus 3 to allow uploading of the image data to the storage 21. Upon receipt of the request, the information processing apparatus 3 (controller 310) decides whether the access-right information, associated with the user identification information of the user of the image forming apparatus 1, is stored in the access-right information storage region 332. When the access-right information associated with the user identification information of the user is stored in the access-right information storage region 332, the controller 310 transmits the image data transmitted from the image forming apparatus 1, which is the object to be stored, to the storage 21. Thus, the image data is stored in the storage 21.

Here, upon receipt of a log-out request with respect to the information processing apparatus 3, from the image forming apparatus 1, the controller 310 of the information processing apparatus 3 allows the image forming apparatus 1 (user identification information of the user permitted to log in) to log out from the information processing apparatus 3. At the same time, the controller 310 transmits a log-out request, to cancel the log-in state thus far maintained for the user with respect to the storage 21, to the managing device 2 of the storage 21, via the communication device 32. Upon receipt of the log-out information, indicating that the log-in state, approved on the basis of the user identification information of the user, has been cancelled, from the managing device 2 via the communication device 32, the controller 310 of the information processing apparatus 3 deletes the access-right information associated with the user identification information of the user, from the access-right information storage region 332.

Hereunder, a management process with respect to the access-right information, stored in the access-right information storage region 332 in the information processing apparatus 3, will be described.

First, an updating process of the access-right information, stored in the access-right information storage region 332, will be described. Upon receipt of an enquiry asking whether the log-in state with respect to the storage 21, approved on the basis of the user identification information of the user, may be maintained, from the managing device 2 of the storage 21 via the communication device 32 at predetermined intervals, the controller 310 of the information processing apparatus 3 decides whether the log-in state of the user identification information of the user, with respect to the information processing apparatus 3, is set to be maintained.

Upon deciding that the log-in state of the user identification information of the user, with respect to the information processing apparatus 3, is set to be maintained, the controller 310 transmits a request to maintain the log-in state with respect to the storage 21, approved on the basis of the user identification information, to the managing device 2 of the storage 21 via the communication device 32. Accordingly, the log-in state approved on the basis of the user identification information of the user is maintained. Thus, the controller 310 updates the access-right information stored in the access-right information storage region 332.

In contrast, upon deciding that the log-in state of the user identification information of the user, with respect to the information processing apparatus 3, is not set to be maintained, the controller 310 transmits a request to cancel the log-in state with respect to the storage 21, approved on the basis of the user identification information, to the managing device 2 of the storage 21 via the communication device 32. Accordingly, the log-in state approved on the basis of the user identification information of the user is cancelled.

Hereunder, the process of deleting the access-right information from the access-right information storage region 332 will be described. When the log-in state of the image forming apparatus 1 to the information processing apparatus 3 is cancelled, on the basis of the user identification information of the user, the controller 310 of the information processing apparatus 3 deletes the access-right information associated with the user identification information of the user of the image forming apparatus 1, the log-in state of which has been cancelled, from the access-right information storage region 332.

In addition, in the case where the instruction regarding the uploading and downloading operation, to and from the storage 21, has not been received for a predetermined period of time, from the image forming apparatus 1 in the log-in state to the information processing apparatus 3 via the communication device 32, the controller 310 of the information processing apparatus 3 deletes the access-right information associated with the user identification information of the user of the image forming apparatus 1 in the log-in state to the information processing apparatus 3, from the access-right information storage region 332.

In general, in the existing image processing apparatuses such as the multifunction peripheral, an exclusive application for each of the storage services is installed, to make access to the storage on the network. Whereas the specification of the storage may sometimes be modified, the software (e.g., firmware) installed in the image processing apparatus has to be updated, when the specification is modified.

However, unlike the case of a general-purpose personal computer, it is difficult to update the software installed in the image processing apparatus set up as an application-specific apparatus. In addition, to add a new storage to be utilized, a new application for the storage to be added has to be additionally installed, in the image processing apparatus.

With the arrangement according to the foregoing embodiment, in contrast, direct communication between the storage 21 on the network and the image forming apparatus 1 is unnecessary. Therefore, it is possible to upload or download data between the storage 21 on the network and the image forming apparatus 1, without the need to update the software installed in the image forming apparatus 1, or add an application.

As another embodiment, when the download request of the image data stored in the storage 21, as the object to be printed, is received from the image forming apparatus 1, and the image data designated as the object to be printed is acquired from the storage 21, as shown in FIG. 5A, the controller 310 of the information processing apparatus 3 may convert the acquired image data into print data (page description language) that can be printed by the image forming apparatus 1, and transmit the converted print data to the image forming apparatus 1, via the communication device 32. Such an arrangement alleviates the data processing burden on the image forming apparatus 1.

As still another embodiment, when the image data, and the upload request of the image data to the storage 21 are received from the image forming apparatus 1, and the image data is to be uploaded to the storage 21, as shown in FIG. 5B, the controller 310 of the information processing apparatus 3 may apply the known optical character recognition (OCR) process to the image data, and transmit the data subjected to the OCR process to the storage 21, in addition to, or instead of the image data. Such an arrangement enables the image data to be converted to character data, or the text portion of the image data to be converted to character data, when stored in the storage 21. In addition, the data processing burden on the image forming apparatus 1 can also be alleviated.

According to the foregoing embodiment, the terminal device 4 transmits the log-in information necessary for logging in to the storage 21 to the information processing apparatus 3, according to the instruction from the user. Instead, the terminal device 4 may be configured to also act as an information processing apparatus, so that the terminal device 4 receives the log-in information necessary for logging in to the storage 21 from the user, and transmits the log-in information to the managing device 2. In this case, further, the terminal device 4 (or controller thereof) may act as the information processing apparatus 3, to execute the operation necessary for logging in to the storage 21, the operation necessary for maintaining and cancelling the log-in state, and the operation for causing the storage 21 and the image forming apparatus 1 to upload and download the data between each other, all of which are to be executed by the information processing apparatus 3.

The disclosure may be modified in various manners, without limitation to the configuration according to the foregoing embodiments. Further, the configurations and processings described in the embodiments with reference to FIG. 1 to FIG. 5 are merely exemplary, and in no way intended to limit the disclosure to those configuration s.

While the present disclosure has been described in detail with reference to the embodiments thereof, it would be apparent to those skilled in the art that various changes and modifications may be made therein within the scope defined by the appended claims.

What is claimed is:

1. An information processing apparatus comprising:

a communication device that performs data communication with an external device, via a network;

an access-right information storage device containing access-right information with respect to a storage on the network, in association with user identification information for identifying a user; and a control device including a processor, and configured to act, when the processor executes a control program, as a controller that makes access to the storage according to a processing request from the user, in a case where the access-right information, associated with the user identification information of the user requesting the processing, is stored in the access-right information storage device, when the communication device receives, from an external image processing apparatus, the processing request to the storage from the user, wherein the controller causes the storage and the image processing apparatus to upload and download data between each other, via the communication device, wherein the controller is configured to:

transmit, when the communication device receives authentication information of the user, required for logging in to the storage, from an external terminal device, the authentication information of the user, to a managing device managing the storage via the communication device, when logging in to the storage; and store, upon receipt, via the communication device, of the access-right information transmitted from the managing device in response to the transmission of the authentication information of the user, the received access-right information in the access-right information storage device, in association with the user identification information.

2. The information processing apparatus according to claim 1, wherein the controller is configured to update the access-right information stored in the access-right information storage device, at predetermined time intervals, through the managing device.

3. The information processing apparatus according to claim 1, wherein the controller is configured to:

perform data communication with the image processing apparatus that has logged in to the information processing apparatus, via the communication device; and delete, when the log-in state of the image processing apparatus is cancelled, the access-right information associated with the user identification information acquired from the image processing apparatus, the log-in state of which has been cancelled, from the access-right information storage device.

4. The information processing apparatus according to claim 1, wherein the controller is configured to:

perform data communication with the image processing apparatus that has logged in to the information processing apparatus, via the communication device; and transmit, upon deciding that the log-in state of the image processing apparatus is not maintained, a request to cancel the log-in state with respect to the storage, to the storage the log-in to which was approved on a basis of the user identification information acquired from the image processing apparatus, the log-in state of which is no longer maintained, via the communication device.

5. The information processing apparatus according to claim 1, wherein, in a case where an instruction regarding an uploading or downloading operation, to and from the storage, has not been received via the communication device for a predetermined period of time, from the image forming apparatus approved to log in to the information processing apparatus, the controller deletes the access-right information associated with the user identification information, received for logging in from the image processing apparatus approved to log in, from the access-right information storage device.

6. The information processing apparatus according to claim 1, wherein, when a download request of data stored in the storage as object to be printed, from the image processing apparatus via the communication device, the controller acquires the data to be printed from the storage, using the access-right information, converts the acquired data to print data of a format that can be printed by the image processing apparatus, and transmits the print data to the image processing apparatus, via the communication device.

7. The information processing apparatus according to claim 1, wherein, when image data to be uploaded to the storage, and an upload request of the image data are received from the image processing apparatus via the communication device, the controller performs character recognition with respect to the image data, and transmits the image data subjected to the character recognition to the storage using the access-right information, via the communication device, thereby storing the image data in the storage.

8. An information processing system comprising:

an image processing apparatus; and the information processing apparatus according to claim 1, the image processing apparatus including:

a reception device that receives log-in information necessary for logging in to the information processing apparatus, from the user; and a data transmission/reception device that transmits the log-in information received by the reception device, to the information processing apparatus, the controller of the information processing apparatus being configured to cause the storage and the image processing apparatus to upload and download data between each other, upon permitting log-in to the information processing apparatus on a basis of the log-in information, after receiving the log-in information from the image processing apparatus, via the communication device.

* * * * *